United States Patent
Gao et al.

(10) Patent No.: US 10,928,925 B2
(45) Date of Patent: Feb. 23, 2021

(54) METHOD AND SYSTEM FOR RECOMMENDING CANDIDATES IN INPUT METHOD

(71) Applicant: KIKA TECH (CAYMAN) HOLDINGS CO., LIMITED, Beijing (CN)

(72) Inventors: Yuan Gao, Beijing (CN); Li Tian, Beijing (CN)

(73) Assignee: KIKA TECH (CAYMAN) HOLDINGS CO., LIMITED, Beijing (CN)

( * ) Notice: Subject to any disclaimer, the term of this patent is extended or adjusted under 35 U.S.C. 154(b) by 71 days.

(21) Appl. No.: 15/891,651

(22) Filed: Feb. 8, 2018

(65) Prior Publication Data
US 2018/0373346 A1    Dec. 27, 2018

(30) Foreign Application Priority Data

Jun. 26, 2017 (CN) .......................... 201710495862.X

(51) Int. Cl.
| | | |
|---|---|---|
| G06F 3/041 | (2006.01) | |
| G06F 3/042 | (2006.01) | |
| G06F 3/0488 | (2013.01) | |
| G06F 3/023 | (2006.01) | |
| G06F 16/338 | (2019.01) | |
| H03M 11/08 | (2006.01) | |
| G06K 15/02 | (2006.01) | |
| G06F 40/274 | (2020.01) | |

(52) U.S. Cl.
CPC .......... *G06F 3/0237* (2013.01); *G06F 3/0236* (2013.01); *G06F 3/0426* (2013.01); *G06F 3/04883* (2013.01); *G06F 3/04886* (2013.01); *G06F 40/274* (2020.01)

(58) Field of Classification Search
CPC ..... G06F 3/0237–04883; H03M 11/08; G06Q 50/22; G06N 3/08
See application file for complete search history.

(56) References Cited

U.S. PATENT DOCUMENTS

| 7,649,478 B1 * | 1/2010 | Yoon ....................... H03M 11/08 341/22 |
| 9,244,612 B1 * | 1/2016 | Azenkot ................ G06F 3/0489 |
| 2004/0117740 A1 * | 6/2004 | Chen ............................ 715/210 |
| 2004/0205486 A1 * | 10/2004 | Kurumida ............... G06K 15/02 715/205 |
| 2008/0259022 A1 * | 10/2008 | Mansfield ............. G06F 3/0237 345/156 |
| 2009/0322688 A1 * | 12/2009 | Ording ................ G06F 3/04897 345/173 |
| 2011/0078613 A1 * | 3/2011 | Bangalore ............. G06F 3/0426 715/773 |
| 2012/0105331 A1 * | 5/2012 | Nomoto ................... G06F 3/041 345/169 |

(Continued)

*Primary Examiner* — Lin Li
(74) *Attorney, Agent, or Firm* — Anova Law Group, PLLC

(57) ABSTRACT

In a method and a system for recommending candidates in an input method, an initial key code and/or an initial key code string inputted by a user using an input method is received; according to the initial key code, a recommended input character is determined; and a weight of the recommended input character is increased.

20 Claims, 5 Drawing Sheets

(56) References Cited

U.S. PATENT DOCUMENTS

| | | | |
|---|---|---|---|
| 2012/0223889 A1* | 9/2012 | Medlock | G06F 3/04886 345/168 |
| 2013/0046544 A1* | 2/2013 | Kay | G06F 3/04886 704/275 |
| 2013/0314352 A1* | 11/2013 | Zhai | G06F 3/04886 345/173 |
| 2014/0058725 A1* | 2/2014 | Longe | G06F 3/0236 704/9 |
| 2015/0199426 A1* | 7/2015 | Lim | G06F 16/338 707/723 |
| 2015/0248386 A1* | 9/2015 | Lin | G06F 3/0237 715/271 |
| 2016/0259545 A1* | 9/2016 | Zhang | G06F 3/04886 |
| 2018/0067919 A1* | 3/2018 | Ning | G06F 3/04883 |

* cited by examiner

METHOD AND SYSTEM FOR RECOMMENDING CANDIDATES IN INPUT METHOD

CROSS-REFERENCES TO RELATED APPLICATIONS

This application claims the priority of Chinese Patent Application No. 201710495862.X filed on Jun. 26, 2017, the entire contents of which are incorporated herein by reference.

TECHNICAL FIELD

The present disclosure relates to the technical field of input methods and, more particularly, to a method and system for recommending candidates in an input method.

BACKGROUND

With the rapid development of terminal devices and technologies, users can use mobile terminals to realize various functionalities based on information transmission manners, such as, record of literal information and usage of communication software. In usage of mobile terminals, input of the literal information using an input method and a virtual keyboard on mobile terminals is one of the most commonly used functionalities of the mobile terminals. However, due to the limited size of the screen of a mobile terminal, when a user inputs literal information using a virtual keyboard displayed on the screen of the mobile terminal, erroneous input may occur because the user's finger may touch key(s) surrounding the target key.

At present, in order to solve the above problem, mobile terminals having a large screen may be used, or Jiugongge keyboards (square nine key keyboards) may be used, so that the area of each key on the keyboard is enlarged. However, the keys on the Jiugongge keyboard are not suitable for all input methods, and steps for users to select input candidates are increased when the Jiugongge keyboards are used, which results in reduced input efficiency of characters.

BRIEF SUMMARY OF THE DISCLOSURE

In view of the above problems, embodiments of the present disclosure are proposed to provide a method and system for recommending candidates in an input method, which are capable of overcoming whole or a part of the above-discussed problems.

In order to address the above problems, there is provided a method for recommending candidates in an input method, including:

receiving an initial key code and/or an initial key code string inputted by a user using an input method;

according to the initial key code, determining a recommended input character; and increasing a weight of the recommended input character.

Optionally, the step of determining the recommended input character according to the initial key code, includes:

for each character in the initial key code string, obtaining a weight of the character and weights of characters surrounding the character, and establishing a key code string weight list having a corresponding hierarchy according to a character input order;

when obtaining character combinations from a dictionary, according to a correspondence relationship between a hierarchy in the dictionary of the input method and the hierarchy in the key code string weight list, determining weights of the character combinations using the key code string weight list;

based on the weights of the character combinations, determining ranking of candidates corresponding to the character combinations; and according to the ranking of candidates corresponding to the character combinations, determining the recommended input character.

There is also provided a system for recommending candidates in an input method, including one or more processors, and a memory, where one or more program modules are stored in the memory and executed by the one or more processors. The one or more program modules include:

an initial key code string receiving module configured to receive an initial key code and/or an initial key code string inputted by a user using an input method;

a recommended input character determination module configured to, according to the initial key code, determine a recommended input character; and a weight increasing module configured to increase a weight of the recommended input character.

Optionally, the recommended input character determination module includes:

a key code string weight list establishing sub-module configured to, for each character in the initial key code string, obtain a weight of the character and weights of characters surrounding the character, and establish a key code string weight list having a corresponding hierarchy according to a character input order;

a weight determination sub-module configured to, when character combinations are obtained from a dictionary, according to a correspondence relationship between a hierarchy in the dictionary of the input method and the hierarchy in the key code string weight list, determine weights of the character combinations using the key code string weight list; and a candidate ranking determination sub-module configured to, based on the weights of the character combinations, determine ranking of candidates corresponding to the character combinations.

a recommended input character determination sub-module configured to, according to the ranking of candidates corresponding to the character combinations, determine the recommended input character.

Embodiments of the present disclosure may have the following advantages:

In embodiments of the present disclosure, an initial key code and/or a key code string inputted by a user using an input method is received; according to the initial key code, a recommended input character is determined; and a weight of the recommended input character is increased. This can solve the problem that when a user input characters through a virtual keyboard of a mobile terminal, the user may usually touch keys surrounding a target key and the possibility that wrong input candidates are recommended.

In this way, embodiments of the present disclosure can solve the problem that erroneous candidate input may occur because a user's finger often touches keys surrounding the target key when the user inputs literal information using a virtual keyboard displayed on a mobile terminal. Thus, the error correction capability during input of key codes by the user may be improved, and the accuracy of the candidates of the input method and convenience for user input may be increased.

DETAILED DESCRIPTION

In order to make the above objectives, features and advantages of the present disclosure clearer, the present disclosure will be described below with reference to accompanying drawings and specific implementations.

First Embodiment

Figure 1:
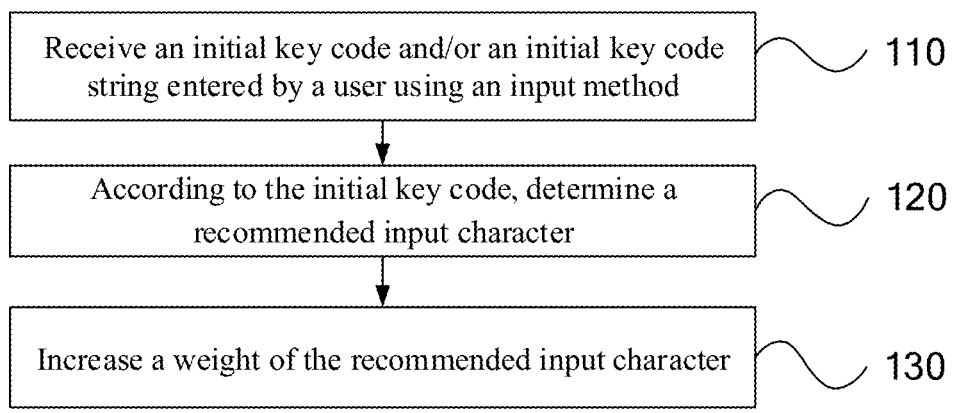
FIG. 1 is a flowchart showing a method for recommending candidates in an input method according to the present disclosure.

FIG. 1 is a flowchart showing a method for recommending candidates in an input method according to the present disclosure. As shown in FIG. 1, the method may include the following steps.

In step 110, an initial key code and/or a key code string inputted by a user using an input method is received.

More specifically, when a user inputs literal information using a mobile terminal, a virtual keyboard interface will pop up from the display interface of the mobile terminal. Further, touch operations of the user on the screen of the mobile terminal may be received, the touch points associated with the touch operations may correspond to key values of the virtual keyboard on the display interface, and the key code string inputted by the user may be determined.

Figure 1A:
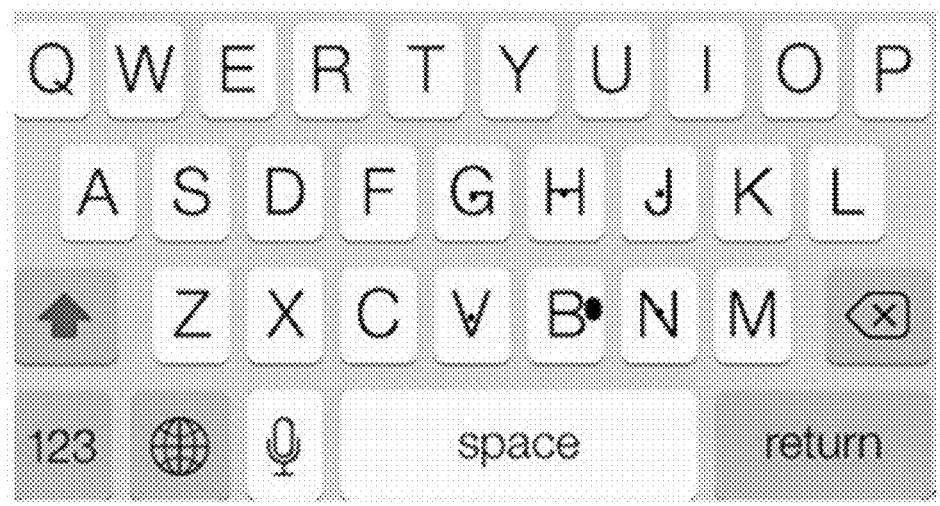
FIG. 1A is a schematic diagram illustratively showing an example of a keyboard for an input method.

For example, FIG. 1A shows a virtual keyboard on a display interface of a mobile terminal. By the touch points of the user on the screen, the key value(s) that the user wants to input may be determined, and one key value inputted by the user or the initial key code string comprising a plurality of key values inputted by the user are recorded. When the user inputs a character, a next character to be inputted may be predicted according to a next character corresponding to the character in a preset dictionary. When the user inputs at least two characters, i.e., the user triggers two touch points, a character combination may be generated, and according to the positions of the two touch points, a target key may be determined, thereby generating a series of character combinations.

In step 120, according to the initial key code and/or the key code string, a recommended input character is determined.

More specifically, after the initial key code or the initial key code string inputted by the user is determined, according to a comparison between a preset language dictionary and the initial key code or the key code string, a possible option of the next character to be inputted by the user can be obtained. In practical applications, for example, the character to be inputted may be determined according to cloud data of a particular user input habit corresponding to the current input method or according to scores of candidates. For example, according to the language dictionary, if a key code string inputted by the user is "tran", some letters may be combined with the string to form a word, such as 'transfer', 'translate', 'translation', and 'transmit'. Further, according to the user input habit, "transfer" may be the most frequently used word, and thus "transfer" is determined as the top one character to be recommended for the user.

In step 130, a weight of the recommended input character is increased.

More specifically, the distances from a touch point to centers of a plurality of keys surrounding the touch point are, respectively, in direct proportion to the weights of the plurality of keys. The closer a key is positioned with respect to the touch point, the higher the weight of the key will be, and thus the easier for the key to be selected. If the probability of a candidate word is greater than a threshold value, when determining the next character to be inputted by the user, the weight(s) of the character(s) may be increased to make the character(s) easier to be selected.

In the embodiment of the present disclosure, an initial key code and/or an initial key code comprising at least two initial key code inputted by a user using an input method may be received; for each character in the initial key code string, a weight of the character and weights of characters surrounding the character are obtained, and a key code string weight list having a corresponding hierarchy is established according to a character input order; when obtaining character combinations from a dictionary, according to a correspondence relationship between a hierarchy in the dictionary of the input method and the hierarchy in the key code string weight list, weights of the character combinations are determined using the key code string weight list; based on the weights of the character combinations, ranking of candidates corresponding to the character combinations is determined; according to the ranking of candidates corresponding to the character combinations, the recommended input character is determined; and the weight of the recommended input character is increased.

In this way, embodiments of the present disclosure can solve the problem that erroneous candidate input may occur because a user's finger often touches keys surrounding the target key when the user inputs literal information using a virtual keyboard displayed on a mobile terminal. Thus, the error correction capability during input of key codes by the user, and the accuracy of the candidates of the input method and convenience for user input may be improved.

Second Embodiment

Figure 2:
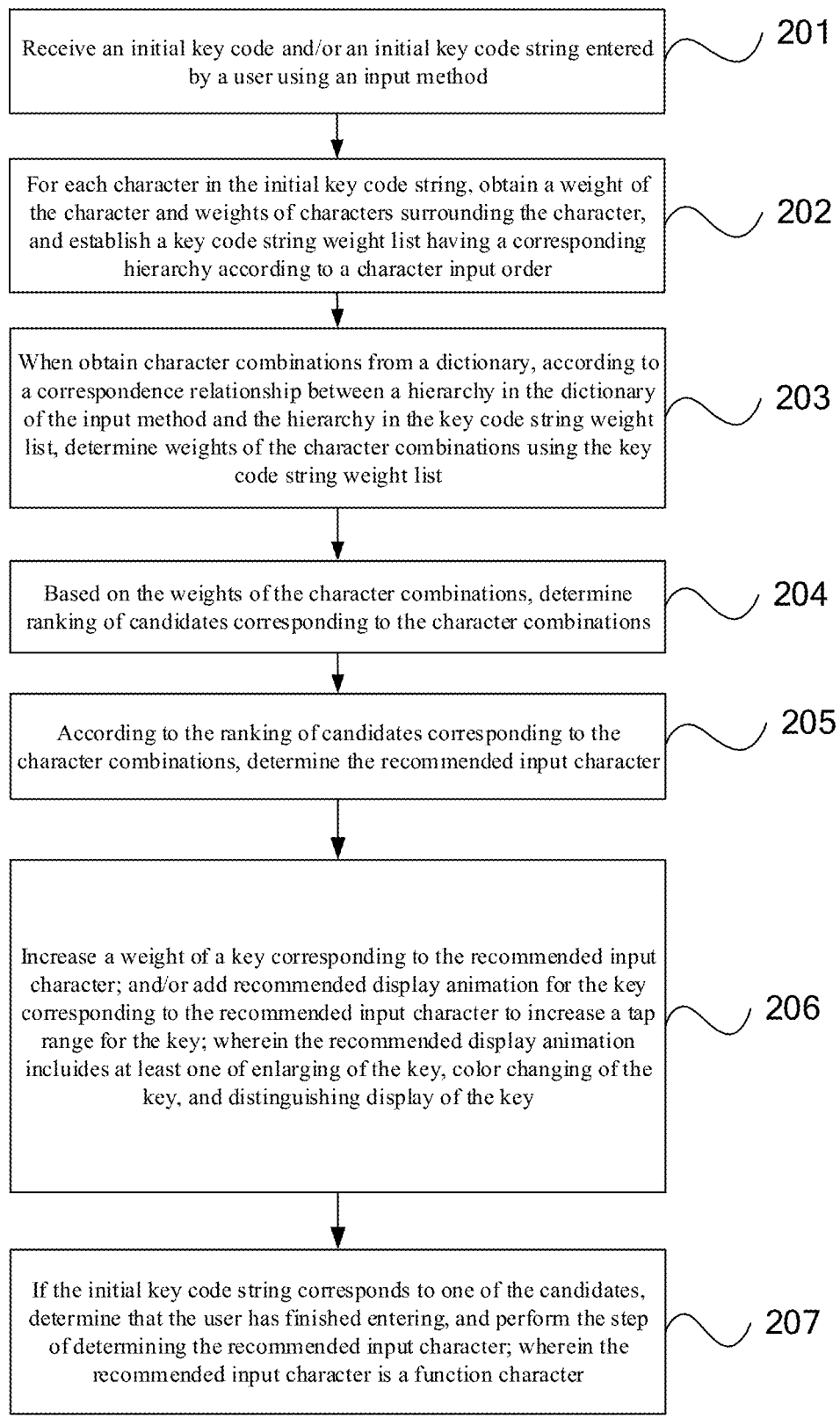
FIG. 2 is a flowchart showing another method for recommending candidates in an input method according to the present disclosure.

FIG. 2 is a flowchart showing a method for recommending candidates in an input method according to the present disclosure. As shown in FIG. 2, the method may include the following steps.

In step 201, an initial key code and/or a key code string inputted by a user using an input method is received.

This step is the same with step 110, and repeated descriptions are be omitted herein.

In step 202, for each character in the initial key code string, a weight of the character and weights of characters surrounding the character are obtained, and a key code string weight list having a corresponding hierarchy is established according to a character input order.

More specifically, after the plurality of key values inputted by the user are recorded as the initial key code string, according to the key values of initial keys tapped or clicked by the user, keys surrounding each of the initial keys with a key value are marked. Further, according to the distances from the surrounding keys to the initial keys, weight values of the initial keys and the surrounding keys are marked, and the key values and weight values of the initial keys in the initial key code string and the key values and weight values of the surrounding keys are recorded to generate a hierarchical key code string weight list.

Figure 1B:
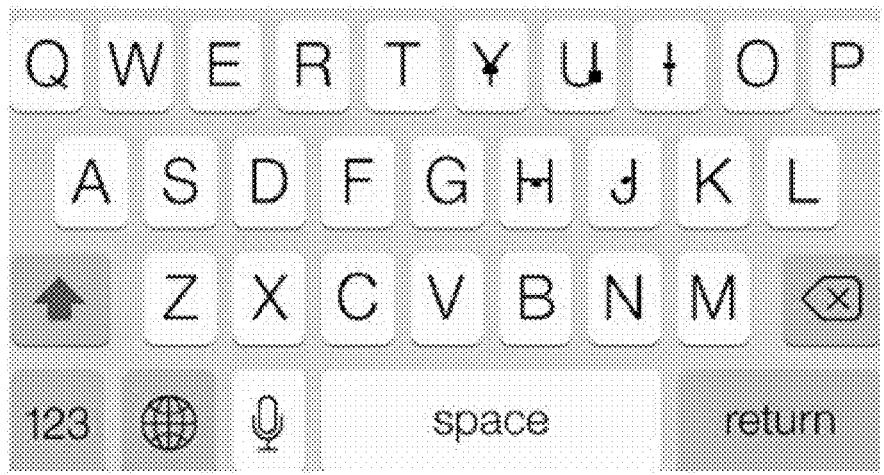
FIG. 1B is a schematic diagram illustratively showing another example of a keyboard for an input method.
Figure 1C:
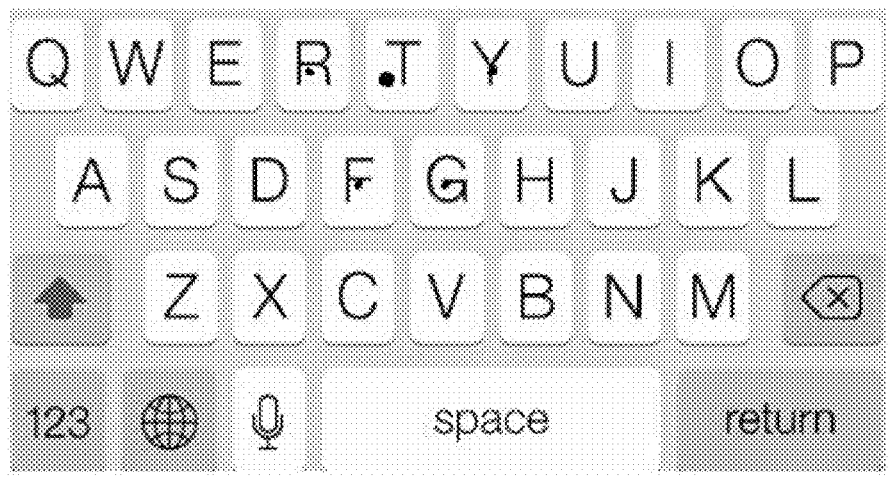
FIG. 1C is a schematic diagram illustratively showing another example of a keyboard for an input method.

For example, FIG. 1A is a schematic diagram illustratively showing an example of a keyboard for an input method. FIG. 1B is a schematic diagram illustratively showing another example of a keyboard for an input method. FIG. 1C is a schematic diagram illustratively showing another example of a keyboard for an input method. If the user wants to input a word "BUT", the user may sequentially tap or click keys "B", "U", and "T" on the keyboard, as shown in FIGS. 1A, 1B and 1C.

Further, when the touch operations on the three keys, i.e., "B", "U" and "T", are received, the keys surrounding the three keys are respectively marked. Specifically, the keys surrounding the key "B" include five keys: "V", "G", "H", "J", "N", the keys surrounding the key "U" include four keys: "Y", "H", "J", "I", and the keys surrounding the key "T" include four keys: "R", "F", "G", "Y". After the keys surrounding the initial keys are marked, the distances from the initial keys to the respective surrounding keys may be calculated according to the center coordinates of the surrounding keys and the center coordinates of the initial keys. Further, according to the distances, weight values may be assigned or marked.

Assuming that the weight value of an initial key is 5.0, the weight value of the key which is closest to the initial key is marked as 4.5, the weight value of the key which is the second closest to the initial key is marked as 4.0, and so on, until the weight values for all of the keys surrounding the initial key are marked and recorded. According to the above rule, the key code string weight list for "BUT" may be as follows.

{
{[B,5.0], [N,4.5], [J,4.0], [V,3.5], [H,3.0], [G,2.5]},
{[U,5.0], [I,4.5], [J,4.0], [H,3.5], [Y,3.0]},
{[T,5.0], [R,4.5], [F,4.0], [G,3.5], [Y,3.0]}
}

Optionally, step 202 may include sub-steps 2021 to 2024.

In sub-step 2021, touch point coordinates of touch points on an input keyboard interface when the user inputs the initial key code string are recorded.

More specifically, by touch sensing elements on the display screen of the mobile terminal, touch operations of the user on the display screen may be received. Generally, the display screen of a mobile terminal may be a thermal capacitive screen or a resistive screen. For a resistive screen, by detecting slight tap or press of the user, the touch operations of the user may be identified. The capacitive screen detects the touch operations of the user by sensing human body heat, and may realize multi-point touch. Thus, the display screen of the mobile terminal may capture the touch points associated with each touch operation of the user according to the touch operations of the user, and obtain touch point coordinates of the touch points on the display screen.

In sub-step 2022, for each of the touch point coordinates, a key associated with the touch point coordinate and keys surrounding the key are determined.

More specifically, when the user touches the display screen of the mobile terminal, the touch operations of the user can be received by pressure sensing or thermal sensing. When the touch operations of the user are received, after the touch point coordinates are obtained according to the touch points on the screen, the key values of the initial keys inputted by the user may be obtained according to the touch point coordinates and the coordinates of each key of the virtual keyboard on the display screen. After the initial keys are determined, the keys surrounding the initial keys may be further determined.

For example, as shown in FIG. 1A, if the initial position where the user touches the display screen of the mobile terminal is the position marked with the large black dot, by calculating the coordinates of the dot on the display screen, it can be determined that the key which is closest to the dot is the key "B" on the virtual keyboard, and thus it can be determined that the initial key code touched by the user is "B". After the initial key code "B" is determined, the keys surrounding the key "B" may be determined as "G", "H", "V", "J" and "N".

In sub-step 2023, first distances between the touch point coordinate and the keys surrounding the touch point coordinate are calculated.

More specifically, in view of the description of step 203, after the keys surrounding the key "B" are determined as "G", "H", "V", "J" and "N", distances between the center coordinates of the keys "G", "H", "V", "J" and "N" and the coordinates of the initial user touch point are calculated as first distances. For example, the large black dot in FIG. 1A represents the position where the initial user touch point is, the small black dots in FIG. 1A represent the positions where the center coordinates of the keys "G", "H", "V", "J", and "N" are, and the first distances may be obtained by calculating the distances from the large black dot to the small black dots, respectively.

In sub-step 2024, according to the first distances of the keys, a weight of a key value of the key associated with the touch point coordinate and weights of key values of the keys surrounding the key are determined, and the key code string weight list having the corresponding hierarchy according to the character input order of characters in the initial key code string is established.

More specifically, according to the distances between the coordinates of the initial user touch point and the center coordinates of the surrounding keys, the weight values of the key values corresponding to the surrounding keys may be marked. For example, as shown in FIG. 1A, when the key corresponding to the user touch point is determined to be the key "B", the key code "B", "N", "J", "V", "H" and "G" may be obtained by calculating the distances from the surrounding keys to the initial touch point coordinates. Further, the weight of the key code "B" is marked as 5.0, the weight of the key code ("N") which is closest to the key code "B" is marked as 5*0.9, the weight of the key code ("J") which is second closest to the key code "B" is 5*0.8, the weight of the key code ("V") which is third closest to the key code "B" is 5*0.7, and so on, so that a weight list may be obtained as follows:

{[*B*,5.0],[*N*,4.5],[*J*,4.0],[*V*,3.5],[*H*,3.0],[*G*,2.5]}.

Similarly, as shown in FIG. 1B, it can be determined that the second key code inputted by the user is "U", and the key code weight list for "U" may be obtained as follows:

{[*U*,5.0],[*I*,4.5],[*J*,4.0],[*H*,3.5],[*Y*,3.0]}.

As shown in FIG. 1C, it can be determined that the third key code inputted by the user is "T", and the key code weight list for "T" may be obtained as follows:

{[T,5.0],[R,4.5],[F,4.0],[G,3.5],[Y,3.0]}.

So far, the weight list for the key code string inputted by the user may be as follows:

{
  {[B,5.0], [N,4.5], [J,4.0], [V,3.5], [H,3.0], [G,2.5]},
  {[U,5.0], [I,4.5], [J,4.0], [H,3.5], [Y,3.0]},
  {[T,5.0], [R,4.5], [F,4.0], [G,3.5], [Y,3.0]}
}

In step 203, when character combinations are obtained from a dictionary, according to a correspondence relationship between a hierarchy in the dictionary of the input method and the hierarchy in the key code string weight list, weights of the character combinations are determined using the key code string weight list.

More specifically, after the key code string weight list for the initially inputted characters is determined, according to the positions of characters in a tree structure of a dictionary of the input method used by the user, the characters are matched with the characters in the key code string weight list, and further match is performed on sub-nodes according to the match results, so that character combinations in the dictionary of the input method may be obtained for each character in the key code string weight list. Also, according to the weight values of the match results in each level of the dictionary of the input method, the weight values of the character combinations may be calculated.

Optionally, step 203 includes sub-steps 2031-2038.

In sub-step 2031, characters in a first level of character nodes of the dictionary which match a first character in the initial key code string and characters surrounding the first character are saved as root nodes.

Figure 2A:
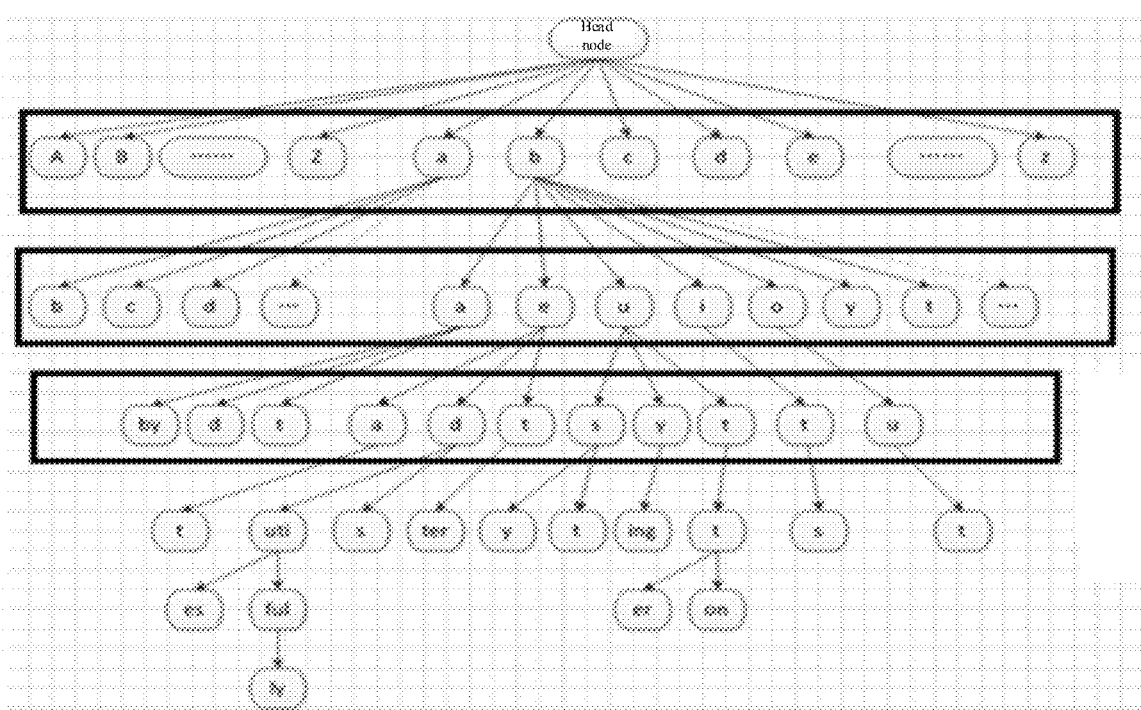
FIG. 2A is a schematic diagram illustratively showing an example of a tree structure for a dictionary of an input method.

In the present embodiment, FIG. 2A depicts a tree structure of a dictionary corresponding to an English input method. According to the tree structure, the head node is null, the first level includes 52 sub-nodes comprising 26 capital and 26 small English letters, respectively. The sub-nodes in the second level are below the nodes in the first level, and are letters of words which begin with the letters of the nodes in the first level; the sub-nodes corresponding to each letter are all possible letters which may form a word with the letter, and each letter node stores a tag which indicates whether the letter may be an end of a word and in addition, a length of the character string of the node and the positions of the lower sub-brother nodes; if the tag indicates that the letter is an end of a word, the tag may further indicate the frequency of the word for the current input method.

Taking the above input method dictionary as an example, if the initial key code string inputted by the user is "BUT", the characters of the level "B" in the weight list, i.e., {[B, 5.0], [N, 4.5], [J, 4.0], [V, 3.5], [H, 3.0], [Q, 2.5]} are matched with the 52 sub-nodes in the first level of the dictionary. According to the match results, the characters on the result nodes, the lexicon position of the nodes, the weights of the nodes in the key code string weight list are stored in the buffer of the current system.

For characters of nodes based on root nodes, the weights of the character combinations are determined according to the following procedure until traversal of characters of all nodes is finished.

In sub-step 2032, for character nodes in an N-th level, N being an integer greater than 1, various types of character combinations corresponding to a parent node of a current node and weights corresponding to the character combinations are read. The various types of character combinations corresponding to the parent node comprise a character combination having no tag, and/or a character combination having a key-missing process tag, and/or a character combination having an extra-input process tag.

More specifically, after match of the initial key code string inputted by the user with the first level of the input method dictionary is finished, the first key code in the key code string is selected from the match results to enter into the sub-nodes of the key code. The sub-nodes in the second level are compared with the second key in the key code string and the keys surrounding the second key one by one; if the first character on the node is the second key or one of the surrounding keys, comparison is continued to compare the second character on the node with the third key in the key code string and the keys surrounding the third key, and so on, until the comparison of all the characters of the node is finished.

If all matches are successful, the character on the node and the characters accumulated from the parent nodes are combined into character combinations, and the lexicon positions of the nodes, the weight values of the nodes, and the accumulated weight values (i.e., the weight values) accumulated from the parent nodes are saved. During the match procedure, if a match is not successful, processes may be performed with respect to the current node under three cases. In a first case in which the user inputs a character incorrectly, the weight value of the character on the node is set to be 0, and the weight value is saved, without any tag.

In a second case in which the user missed a key when entering the key string, the next character is compared with the current key and keys surrounding the current key; if the next character matches the current key or one of the keys surrounding the current key, a key-missing indication is added, the node is saved and a key-missing process tag is marked; if the next character does not match the current key or one of the keys surrounding the current key, no saving is performed.

In a third case in which an extra key is touched by the user, the current character of the current node is compared with the next key code and surrounding keys; if the match is successful, an extra-input process tag is added, and the node is saved; if the match is not successful, no saving is performed. For details, please see Table 1:

TABLE 1

| Accumulated character string | Weight values | Descriptions |
|---|---|---|
| ba | 5.0 | The node a is 0 (with no tag). |
| ba | 5.0 | The node "a" is 0, and the node "a" is marked (with a key-missing process tag). |

TABLE 1-continued

| Accumulated character string | Weight values | Descriptions |
|---|---|---|
| ba | 0 | The node "a" is 0, the character "a" is not the third key or one of the surrounding keys, and thus the node "a" is discarded. |
| be | 5.0 | The node "e" is 0. |
| be | 5.0 | The node "e" is 0, and is marked (with an extra-input process tag). |
| be | 0 | The node "e" is 0, the character "e" is not the third key or one of the surrounding keys, and thus the node e is discarded. |
| bu | 10.0 | The node "u" is 5.0, and if the match is successful, no comparison is performed for the extra-key and key-missing situations. |
| bi | 9.5 | The node "i" is 4.5. |
| bo | — | same with "ba" |
| by | 8.0 | The weight value of the node "y" is 3.0. |
| bt | 5.0 | The node "t" is 0. |
| bt | 5.0 | The node "t" is 0, and is marked (with a key-missing process tag). |
| bt | 10.0 | The node "t" is 5.0, and u is marked (with an extra-input process tag). |
| ... | ... | |

In sub-step 2033, a character of the current node in the dictionary is matched with characters in an N-th level of the key code string weight list.

More specifically, according to the above description regarding sub-step 2032, the procedure for matching the dictionary characters with the characters in an N-th level of the key code string weight list will be described below. After the match of the first level of the dictionary is finished, the node of the first match character is selected, i.e., the sub-node of the character "B" or "b". As can be seen from the dictionary shown in FIG. 2A, the sub-nodes of the character "B" or "b" include "a", "e", "u", "i", "o", "y", "t", . . . , which correspond to the second level of the dictionary. After the sub-nodes of the character "B" are obtained, the characters in the second level of the key code string weight list are matched with the first character of the sub-nodes of the character "B", i.e., "a" is matched with {[U, 5.0], [I, 4.5], [J, 4.0], [H, 3.5], [Y, 3.0]} one by one. Next step may be performed according to the match result.

In sub-step 2034, if the character of the current node in the dictionary matches a character in the N-th level of the key code string weight list, the character of the current node is combined with the various types of character combinations corresponding to the parent node into various types of character combinations corresponding to the current node and weights are updated, and the various types of character combinations corresponding to the current node and the weights corresponding to the various types of character combinations are saved.

More specifically, according to the description regarding sub-step 2033, after matching the sub-nodes of the character "B" with "{[U, 5.0], [I, 4.5], [J, 4.0], [H, 3.5], [Y, 3.0]}," if the match is successful, the character combinations of this node are recorded, the weights are updated and saved. For example, according to Table 1, the sub-node "u" of the character "B" matches [U, 5.0] in {[U, 5.0], [I, 4.5], [J, 4.0], [H, 3.5], [Y, 3.0]}, the weights of the two characters are added to obtain an updated weight value of 10.0, and the character combination "Bu" formed by the two characters are saved.

If the character of the current node does not match the characters in the N-th level of the key code string weight list, the following steps may be performed.

In sub-step 2035, for a character combination having no tag, the character of the current node is combined with a character combination having no tag of the parent node into a character combination corresponding to the character combination having no tag of the current node, and a weight is updated and saved.

More specifically, according to the description of sub-step 2034, the sub-nodes are matched with "{[U, 5.0], [I, 4.5], [J, 4.0], [H, 3.5], [Y, 3.0]}," one by one. For example, if "a" does not matches any one of the characters in the weight list, the processes under three cases described with respect to step 2032 may be performed.

As shown in Table 1, there are three cases for "a". In the first case, if "a" has no tag, the weight of "a" is 0, because the weight of "ba" is the sum of the weight of "b" (i.e., 5.0) and the weight of "a", the weight of "ba" is 5.0. Similarly, in the second case, if "a" has a key-missing process tag, the weight of "ba" is 5.0. For the third case in which "a" has an extra-input process tag, "a" is matched with the third level of the key code string weight list; if the match is successful, the tag is maintained, and the character combination is saved in a buffer of the system; if the match is not successful, no saving is performed. Because no successful match is found after matching "a" with the characters in the third level of the key code string weight list, i.e., {[T, 5.0], [R, 4.5], [F, 4.0], [Q, 3.5], [Y, 3.0]} one by one, the extra-input process tag, the character combination and the weight thereof are not recorded, as shown in the third row of Table 1.

In sub-step 2036, characters of sub-nodes of the current node are matched with the characters in the N-th level of the key code string weight list; if a successful match occurs, the character of the current node is combined with the character combination having no tag of the parent node into a character combination corresponding to a character combination of the current node which has a key-missing process tag, and the weight is updated and saved. If no successful match occurs, the weight is not saved.

More specifically, according to the description regarding sub-step 2034, the data of the three cases are saved according to the parent node of the current node, i.e., the contents in Table 1. The characters of the level in the key code string weight list corresponding to the current node are matched with the character combinations having a key-missing process tag one by one; if the match is successful, the matching character is combined with the character combination formed by the parent node into a new character combination, and the weight value of the new character combination is saved in the buffer of the system. If the match of the character and the key and the surrounding keys is failed, and the key-missing and extra-input processes have been performed on the above level, key-missing or extra-input process is not performed again. This can avoid a too large difference between the keys and the words. The above processes are performed with respect to each node in the current level of the dictionary until all matches are finished, and then the processes of next level are conducted according to the saved new character combinations.

In sub-step 2037, the character of the current node is matched with characters in a (N+1)-th level of the key code string weight list; if a successful match occurs, the character of the current node is combined with the character combination having no tag of the parent node into a character combination corresponding to a character combination of the current node which has an extra-input process tag, and a weight is updated and saved; if no successful match occurs, a weight is not saved.

More specifically, the sub-step 2037 is similar with sub-step 2036, and deals with the match process on the characters having an extra-input process tag of the parent node. Similarly, if the match is successful, the matching character is combined with the character combinations formed by the parent node to generate a new character combination, and the weight value of the new character combination is saved in the buffer of the system. If the match of the character and the key and the surrounding keys is failed, and the key-missing and extra-input processes have been performed on the above level, key-missing or extra-input process is not performed again. This can avoid over large difference between the keys and the words. The above processes are performed with respect to each node in the current level of the dictionary until all matches are finished, and then the processes of next level are conducted according to the saved new character combinations.

In sub-step 2038, for a character combination having a tag, the characters of sub-nodes of the current node are matched with the characters in the N-th level of the key code string weight list; if a successful match occurs, the character of the current node is combined with a character combination having a tag of the parent node into a character combination having a tag corresponding to the current node, and a weight is updated and saved; if no successful match occurs, a weight is not saved.

More specifically, for the character combination having a key-missing process tag, the characters of sub-nodes of the character are matched with the characters in the corresponding upper level of the key code string weight list one by one. For example, in the second row of Table 1, "a" is marked as "with a key-missing process tag", the characters of the sub-nodes of "a" (i.e., "by", "d", "t") are matched with the characters in "{[U, 5.0], [I, 4.5], [J, 4.0], [H, 3.5], [Y, 3.0]}" one by one; if a successful match occurs, the matching character of the sub-node of "a" is combined with the previously formed character combination into a new character combination, and the weight of the new character combination is recorded and saved in the buffer of the system; if no successful match occurs, no saving is performed. As shown in Table 2, after "a" is marked as "with a key-missing process tag", the sub-nodes of "a" (i.e., "by", "d", "t") are matched with the characters in "{[U, 5.0], [I, 4.5], [J, 4.0], [H, 3.5], [Y, 3.0]}" one by one, and no successful matches occurs. Thus, the contents in Table 2 are discarded.

TABLE 2

| Accumulated character string | Weight value | Descriptions |
|---|---|---|
| baby | 5.0 | The node "by" is 0, and does not match the characters in "b" and "u" level of the weight list. |
| bad | 5.0 | The node "d" is 0, and does not match the characters in "d" and "u" level of the weight list. |
| bat | 5.0 | The node "t" is 0, and does not match the characters in "t" and "u" level of the weight list. |

In the embodiment of the present disclosure, for a current level character having an extra-input process tag, the character is normally matched with the characters in the current level of the key code weight list; if a successful match occurs, the matching character is combined with the upper level character combination, and the new character combination and a weight thereof are saved; if no successful match occurs, the character is discarded.

In step 204, based on the weights of the character combinations, ranking of candidates corresponding to the character combinations is determined.

More specifically, according to the calculated weights of the character combinations, the character combinations obtained from the dictionary of the input method are ranked, a character combination having a larger weight value will be given higher ranking. The ranking may be performed according to the candidates formed by the character combinations, the input habit of the user who inputs the characters, and the input lexicon selected by the user. Further, the weights may be further calculated by performing statistics on the frequency of the candidates in the current input method using big data statistics. Embodiments of the present disclosure do not impose specific limitations on this.

Optionally, step 204 includes sub-steps 2041 to 2043.

In sub-step 2041, if there is a character combination having a key-missing process tag among the character combinations, a weight of the character combination having the key-missing process tag is adjusted according to a first preset rule.

More specifically, according to the descriptions regarding steps 203, if the matches for all characters are finished, the finally saved information is processed according to all the key codes. Among all the character combinations, the character combinations may vary depending on the sub-nodes of each character in the dictionary. However, the calculated weights may be the same. For example, the character combination having a key-missing process tag and a character combination having no tag may have the same weight.

As shown in Table 3, the weight of the character combination "but" and the weight of the character "butter" are the same after the comparison between the dictionary and the key code string weight list; however, what the user inputted is "but". Thus, according to the initial key code string inputted by the user, "but" should have the highest ranking among all candidates; because "butter" is an extended candidate generated according to a sub-node of the dictionary and has a length longer than that of the initial key code string, the weight value of "butter" should be multiplied by 0.9. The weight values other candidates in Table 3 may be processed according to the above rule. Rather, in practical application, the current weight values may be further processed according to features of the candidate, such as the frequency, popularity over network, and so on and embodiments of the present disclosure do not impose specific limitations on this.

TABLE 3

| Word | Weight values | Descriptions |
| --- | --- | --- |
| but | 15.0 | All of the three keys match the word, and thus the word has the highest weight value. |
| butter | 13.5 | The word "butter" includes "but", and thus the weight value of "butter" should be obtained by multiplying the weight value of "but" by 0.9. |
| button | 13.5 | same with "butter" |
| bit | 14.5 | The weight value of "i" is 4.5, and the weight value of each of the remaining two letters is 5.0. |
| bits | 13.05 | The word "bits" includes "bit", and thus the weight value of "bits" should be obtained by multiplying the weight value of "bit" by 0.9. |
| buy | 13.0 | The weight value of "y" is 3, and the weight value of each of the remaining two letters is 5.0. |
| buying | 11.7 | The word "buying" includes "buy", and thus the weight value of "buying" should be obtained by multiplying the weight value of "buy" by 0.9. |
| buys | 11.7 | same with "buying" |
| bt | 14.5 | The "bt" has an extra-input tag about "u", and the weight value should be completed according to the above formula. |
| bust | 13.5 | There are three characters in "bust" which are the same as that in "but", but there is a key-missing tag, and thus the weight value of "bust" should be obtained by multiplying the weight value of "but" by 0.9. |
| bout | 13.5 | same with "bust" |
| bat | 10.0 | The word "bat" have two keys as that in "but", the weight values of each of which is 5.0. |
| bet | 10.0 | same with "bat" |
| better | 9.0 | The word "better" includes "bet", and thus the weight value of "better" should be obtained by multiplying the weight value of "bet" by 0.9. |
| bus | 10.0 | same with "bat" |

In sub-step 2042, if there is a character combination having an extra-input process tag among the character combinations, a weight of the character combination having the extra-input process tag is adjusted according to a second preset rule.

More specifically, according to the descriptions regarding steps 203, if the matches for all characters are finished, the finally saved information is processed according to all the key codes. Information about the first node is retrieved. Firstly, whether there is an extra-input process tag is determined; if there is an extra-input process tag, the weight value needs to be compensated. For example, if four key codes are inputted, the normal comparison result is obtained by accumulating the weight values of the four key codes. If the extra-input process is performed, the weight values of three key codes are accumulated due to omission of one key code. In order to ensure the ranking under the same conditions, the weight value compensation can be performed for all information of the extra-input key code, and the compensated weight value=(the current weight value±(the length of the key code-1))*0.9.

Further, whether the process for omitting the input of one key is needed is determined; if the process for omitting the input of one key is needed, the weight value needs to be multiplied by 0.9. For example, if the user inputs "abc", the weight value of "abc" should be higher than the weight value of "axbc" and the weight value of "abxc". Further, whether the current node is the end of a word is determined; if the current node is the end of a word, whether the last character of the node has been compared is determined (if the last character of the node has been compared, it is indicated that the key length is equal to the length of the word); if the last character of the node has been compared, the accumulated character combinations, the positions in the lexicon and the accumulated weight values are saved in a word list.

Further, all the sub-nodes of the current node are retrieved, and all the words under the node are saved into the word list, including the position of the word in the lexicon, and the weight values which are obtained by multiplying the accumulated weight values by 0.9 Here, the original weight values are scaled down, and because the words having lower ranking are fussy results after the key codes are compensated, the weight values need to be lowered. For example, if "abc" is inputted, the weight value of "abc" is of course higher than the weight values of "abcd", "abcef" and the like. The results after comparison are processed in the same way to generate a word list. The word list includes word letters, the weight values of the words, and the positions of the words in the lexicon.

In sub-step 2043, based on weights of character combinations having no tag and/or adjusted weights of character combinations having the key-missing process tag and/or adjusted weights of character combinations having the extra-input tag, the ranking of the candidates corresponding to the character combinations is determined.

More specifically, if the matches for all characters are finished, the weight of the finally saved information is processed according to all the key codes based on steps 214 and 215, and then all the finally obtained character combinations are ranked. Based on the position of each character of a character combination in the lexicon, the frequency of the character combination, the personal habit of the user, the usage frequency of the word, as well as whether this word has a binary relationship with the word before the cursor in the editor may be obtained. The final ranking may be determined in view of the following factors; rather, in practical applications, other factors may change the ranking of the character combinations as candidates, and embodiments of the present disclosure do not impose specific limitations on this.

Optionally, sub-step 2043 include sub-steps 20431 to 20432.

In sub-step 20431, according to the weights of the character combinations having no tag, and/or the adjusted weights of the character combinations having the key-missing process tag, and/or the adjusted weights of the character combinations having the extra-input process tag, frequency of the character combinations, usage frequency of the character combinations, time periods from the time when the character combinations are last used to the current time point, and multiple relationships between character combinations and previously inputted words, calculating a comprehensive weight for each of the character combinations.

More specifically, based on the position of each character of a character combination in the lexicon, the frequency of the character combination, the usage frequency of the character combination, the time period from the time point when the character combination is last used to the current time point, multiple relationships between character combination and previously inputted words, a comprehensive weight may be calculated for each of the character combinations. Rather, in practical applications, other factors may change the ranking of character combinations which serve as candidates, and embodiments of the present disclosure do not impose specific limitations on this.

In sub-step 20432, based on the comprehensive weights of the character combinations, the candidates corresponding to the character combinations are ranked.

More specifically, according to the calculated comprehensive weights of all the candidate character combinations, the character combinations are ranked according to the weights, and the ranked candidates are displayed on a current candidate representation field of the input method for the user to select.

In step 205, according to the ranking of candidates corresponding to the character combinations, the recommended input character is determined.

Figure 1D:
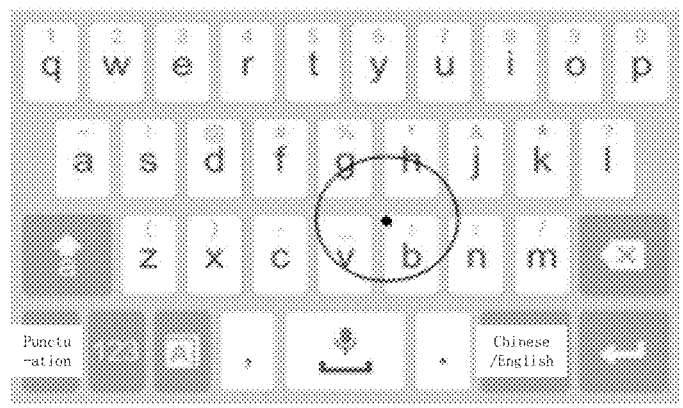
FIG. 1D is a schematic diagram illustratively showing another example of a keyboard for an input method.

More specifically, as described above, assuming that the user wants to input "beautiful", when it is determined that the user triggers one point on the keyboard, for example, the user triggers the upper left corner area of the key "b" as shown in FIG. 1D, the virtual key(s) within a circle, which is drawn with the touch point as a circle center and a preset length as a radius, is(are) deemed as target key(s).

In this example, the letters "g", "h", "j", "v", "b" and "n" are target keys. The positions of the touch points can reflect the actual intention of the user, in order to more accurately recommend candidates for the user, weights may be assigned to "g", "h", "j", "v", "b" and "n", and the weights of "g", "h", "j", "v", "b" and "n" are in direct proportion with the straight-line distances between the center points of the virtual keys and the circle center. Assuming that the weights of "g", "h", "j", "v", "b" and "n" are f(g), f(h), f(j), f(v), f(b), and f(n), respectively.

Figure 1E:
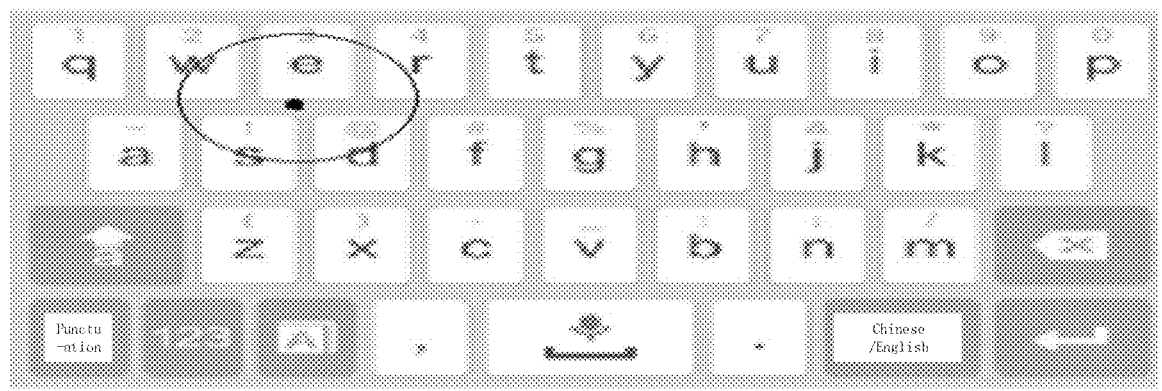
FIG. 1E is schematic diagram illustratively showing another example of an keyboard for an input method.

Then, the user inputs the next character, and the second touch point is shown in FIG. 1E. As can be seen from FIG. 1E, the target keys at this time include "w", "e", "r", "s" and "d". According to the above described computing method, the weights of "w", "e", "r", "s" and "d" are f(w), f(e), f(r), f(s) and f(d), respectively. The two consecutive touches of the user may generate a plurality of character sequences. Specifically, the target keys entered for the first time are "g", "h", "j", "v", "b" and "n", the target keys entered for the second time are "w", "e", "r", "s" and "d", and then 30 character sequences may be generated, including "gw", "ge", "gr", "gs", "gd", "hw", "he", "hr", "hs", "hd", "hw", "je", . . . .

Further, the 30 character sequences are sent to an engine which conducts computations. The engine may check the first level of the dictionary, and compare the 26 sub-nodes in the first level with the first character in each of the 30 sequences one by one. It can be found that the node "a" is different from any of the first characters in the sequences, and thus the node "a" in the first level is assigned with a weight of zero. The sub-node "b" in the first level is the same as the first character in the sequences "bw", "be", "br", "bs", "bd", and thus the weight f(b) is assigned to the sub-node "b". In the same way, all sub-nodes in the first level are assigned with weights until the sub-node "z" is assigned with a weight.

Further, the engine checks the characters corresponding to the sub-nodes in the second level; if the character corresponding to one sub-node is the same as one or more of the second characters in the 30 sequences, a weight is assigned to the character corresponding to the sub-node; if the character corresponding to the one sub-node is different from any one of the second characters in the 30 sequences, the weight of the sub-node is set as zero. Then, the weight of each sequence is computed, i.e., the weights of individual sub-nodes in each sequence are added. Further, the weights of the sequences are compared, and the sequence with a higher weight may hit (or match) the user's intention more accurately.

During the input procedure of the user, after obtaining the candidates (usually more than one) using the above method, the user's next input may be predicted according to the obtained candidates. For example, if the user inputs "goo", the engine provides candidates which are ranked as follows: "good", "google", "goodness", "goodbye", "Good", "goodnight". The next character to be input by the user may be "d" or "g"; if the probability of one candidate is greater than a threshold value, the tap range of "d" or "g" may be properly increased, or the weight of "d" or "g" may be properly increased. Thus, the user may select the two letters more easily, thereby increasing the correct rate of the input.

Optionally, the step 205 may include sub-steps 2051 to 2052.

In step 2051, according to the ranking of candidates corresponding to the character combinations, top M candidates are selected as reference candidates, where M is an integer greater than 1.

More specifically, after the ranking of the candidates corresponding to the candidate combinations are obtained, the top M candidates may be selected as the reference candidates. For example, if the user enters "goo", the engine provides candidates which are ranked as follows: "good", "google", "goodness", "goodby", "Good", "goodnight", and then "good" and "google" may be selected as the reference candidates.

In sub-step 2052, if there are n characters in the initial key code string, an (n+1)-th character in the M reference candidates is determined as the recommended input character, where n is an integer greater than 1.

In the embodiment of the present disclosure, as described in sub-step 2051, when "good" and "google" are selected as the reference candidates, if the initial key code strings include three characters, the fourth character in the reference candidates is selected as the recommended input character. For example, if the first three characters entered by user are "goo", the fourth character in "good" or "google" is selected as the recommended character, i.e., the recommended input character is "d" or "g".

In step 206, the weight of the key corresponding to the recommended input character is increased; and/or, recommended display animation may be added for the key corresponding to the recommended input character to increase a tap range for the key; the recommended display animation may include at least one of: enlargement of the key, color changing of the key, and distinguished display of the key.

For example, after the recommended input character is determined, it is desired that there is a higher probability for the user to select the recommended character. Thus, according to the ranking of the candidates which the recommended input character is, the weight of the recommended input character is increased by a preset value. For example, as described above, if the recommended input character is "d" or "g", according to the input probabilities of "good" and "google" which are determined by the input method, there is a high probability that "d" or "g" is the next character to be input after "goo" is inputted. The probability of "d" may be higher than the probability of "g", for example, the probability of "d" is 5/6, and the probability of "g" is 1/6, and the tap range of "d" and "g" may be properly increased. Specifically, for the key "d" or "D", the following formula may be used:

$$d=d*50/100+d*50/100*(1-5/6) \quad (1)$$

where 50/100 is a coefficient which is computed by statistics, 5/6 is the probability of the key "d" or "D". The coefficient may be modified, and the most proper coefficient may be selected according to user's input efficiency.

Optionally, in another embodiment of the present disclosure, the method may further includes step 206A to 206C.

In step 206A, a second distance between the touch point coordinate and a key associated with the touch point coordinate is calculated.

More specifically, based on the computing method for obtaining keys in a dynamic hot area, if we deliberately decrease the distance from the touch point to a certain key, it is an equivalent of an increase of the tap range of the key. Thus, the second distance between the touch point coordinate and the key may be computed first.

In step 206B, a third distance between a key corresponding to the recommended input character and the touch point coordinate is calculated.

More specifically, the third distance between the touch point coordinate and the key corresponding to the recommended input character is calculated.

In step 206C, if the third distance is greater than the second distance, the third distance is decreased by a preset threshold to increase the weight of the recommended input character.

More specifically, if the third distance is greater than the second distance, the third distance is decreased by a preset value, and the preset value may be determined according to the weight of each recommended input character. If the weight is large, in practical applications, the decrease of the distance may be computed according to many factors, and the weight of the character is only one of the factors. Embodiments of the present disclosure will not impose specific limitations on this.

After the third distance is decreased by the preset threshold, the third distance may still be greater than the second distance or may become smaller than the second distance. If the third distance is smaller than the second distance, the recommended input character will be selected first. For example, if the user taps the key "F", the distance from the touch position of the user to the center point of the key "F" is defined as dF. If we decrease the distance from the touch point to the center point of the key "D" (the distance is defined as "dD"), dD<dF, and then the key "D" is selected.

In step 207, if the initial key code string corresponds to one of the candidates, it is determined that the user has finished input, and the step of determining the recommended input character is performed. The recommended input character may be a function character corresponding to a function key.

For example, the function keys may refer to the space key, the enter key, the Emoji key, the punctuation keys and the like. Generally, during the input of one word, a user may not use the function keys. After the user finishes input of one word, the probability that the user continues to input the function keys increases. According to the user's input characters and the candidate words, whether the user input a complete word may be determined. If one candidate word includes the user's input characters, it can be determined that the user's input characters constitute one word; if none of the candidate words includes the user's input characters, it can be determined that the user's input characters do not constitute one word.

Further, if the user's input characters do not constitute one word, the tap range of the function key may be properly decreased. That is, the above described method may be adopted, i.e., to increase the distances from the touch point to the function keys, thereby reducing the probability of inadvertent touches by the user. If the user's input characters constitute one word, the function keys can be determined as the recommended input character, the weight assigned to the function keys are increased, and the distances from the function keys to the touch point are decreased, or animation effects are added, thereby improving user's tap probability.

As such, an initial key code and/or an initial key code string inputted by a user using an input method is received; for each character in the initial key code string, a weight of the character and weights of characters surrounding the character are obtained; when character combinations are obtained from a dictionary, according to a correspondence relationship between a hierarchy in the dictionary of the input method and the hierarchy in the key code string weight list, based on the weights of the character combinations, and ranking of candidates corresponding to the character combinations is determined; and then the recommended input character is determined according to the ranking and the characters in the initial key code string inputted by the user.

In this way, embodiments of the present disclosure can solve the problem that erroneous candidate input may occur because a user's finger often touches keys surrounding the target key when the user inputs literal information using a virtual keyboard displayed on a mobile terminal. Thus, the error correction capability during input of key codes by the user may be improved, and the convenience for selecting the candidates of the input method may be increased.

Third Embodiment

Figure 3:
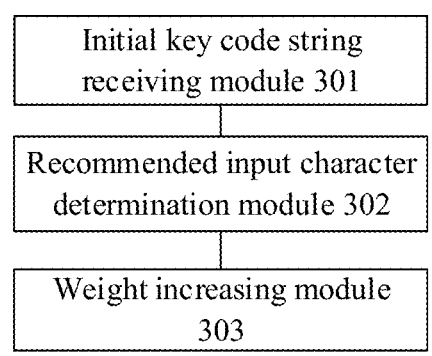
FIG. 3 is a block diagram showing a system for recommending candidates in an input method according to the present disclosure.

FIG. 3 is a block diagram showing a system for recommending candidates in an input method according to an embodiment of the present disclosure. The system may include one or more processors, and a memory, where one or more program modules are stored in the memory and executed by the one or more processors. The one or more program modules may include an initial key code string receiving module 301, a recommended input character determination module 302, and a weight increasing module 303.

The functions of individual modules and interactions among the modules will be described below. More specifically, the initial key code string receiving module 301 is configured to receive an initial key code and/or an initial key code string inputted by a user using an input method.

Figure 4:
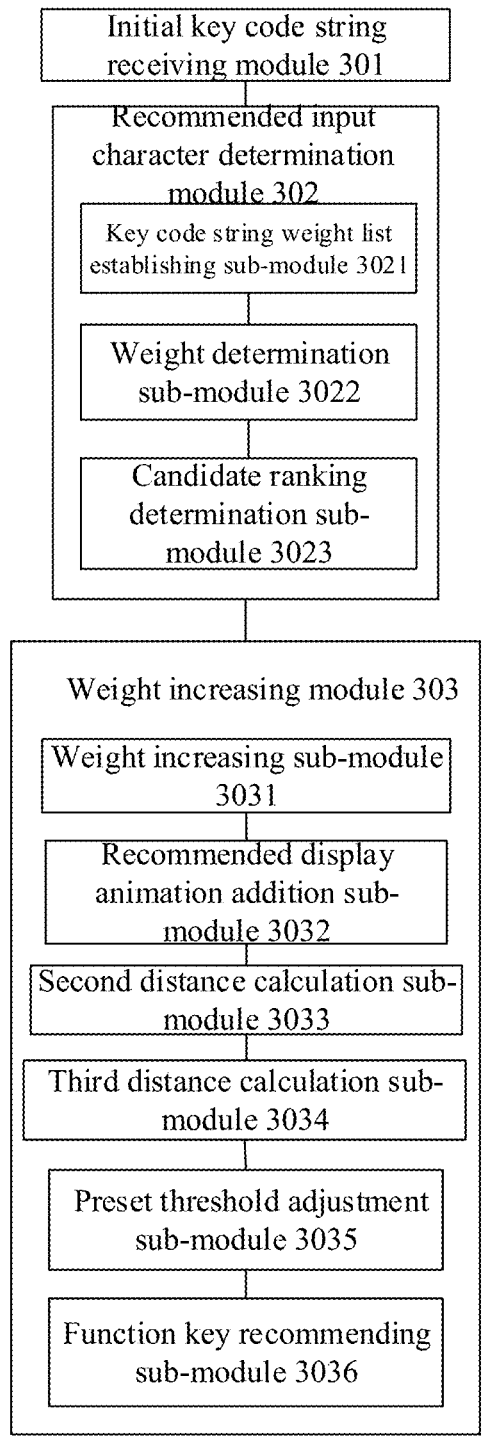
FIG. 4 is a block diagram showing another system for recommending candidates in an input method according to the present disclosure.

The recommended input character determination module 302 is configured to, according to the initial key code, determine a recommended input character. Optionally, referring to FIG. 4, the recommended input character determination module 302 includes a key code string weight list establishing sub-module 3021, a weight determination sub-module 3022, and a candidate ranking determination sub-module 3023.

The key code string weight list establishing sub-module 3021 is configured to, for each character in the initial key code string, obtain a weight of the character and weights of characters surrounding the character, and establish a key code string weight list having a corresponding hierarchy according to a character input order. The weight determination sub-module 3022 is configured to, when character combinations are obtained from a dictionary, according to a correspondence relationship between a hierarchy in the dictionary of the input method and the hierarchy in the key code string weight list, determine weights of the character combinations using the key code string weight list. The candidate ranking determination sub-module 3023 is configured to, based on the weights of the character combinations, determine ranking of candidates corresponding to the character combinations.

Optionally, the key code string weight list establishing sub-module 3021 may include a touch point coordinate recording unit, a touch point coordinate-associated key determination unit, a first distance calculation unit, and a key code string weight list establishing unit. The touch point coordinate recording unit is configured to record touch point coordinates of touch points on an input keyboard interface when the user inputs the initial key code string. The touch point coordinate-associated key determination unit is configured to, for each of the touch point coordinates, determine a key associated with the touch point coordinate and keys surrounding the key.

Further, the first distance calculation unit is configured to calculate first distances between the touch point coordinate and the keys surrounding the key. The key code string weight list establishing unit is configured to, according to the first distances of the keys, determine a weight of a key value of the key associated with the touch point coordinate and weights of key values of the keys surrounding the key, and establish the key code string weight list having the corresponding hierarchy according to the character input order of characters in the initial key code string.

The weight determination sub-module 3022 may include: a first level weight determination unit, an N-th level weight determination unit, a parent node character combination reading unit, a character match unit, a successful match process unit, and a failed match process unit. The first level weight determination unit is configured to save characters in a first level of character nodes of the dictionary which match a first character in the initial key code string and characters surrounding the first character as root nodes. The N-th level weight determination unit is configured to, for characters of nodes based on root nodes, determine the weights of the character combinations according to the following procedure until traversal of characters of all nodes is finished.

Further, the parent node character combination reading unit is configured to, for character nodes in an N-th level, N being an integer greater than 1, read various types of character combinations corresponding to a parent node of a current node and weights corresponding to the character combinations. Further, the various types of character combinations corresponding to the parent node comprise a character combination having no tag, and/or a character combination having a key-missing process tag, and/or a character combination having an extra-input process tag. The character match unit is configured to match a character of the current node in the dictionary with characters in an N-th level of the key code string weight list.

Further, the successful match process unit is configured to, if the character of the current node in the dictionary matches a character in the N-th level of the key code string weight list, combine the character of the current node with the various types of character combinations corresponding to the parent node into various types of character combinations corresponding to the current node and update weights, and save the various types of character combinations corresponding to the current node and the weights corresponding to the various types of character combinations. The failed match process unit is configured to, if the character of the current node does not match the characters in the N-th level of the key code string weight list, perform process based on corresponding character matching rules for different types of character combinations.

Optionally, the failed match process unit may include a no-tagged character combination process sub-unit, an upper level match sub-unit, a lower level match sub-unit, and a tagged character combination process sub-unit.

The no-tagged character combination process sub-unit may be configured to, for a character combination having no tag, combine the character of the current node with a character combination having no tag of the parent node into a character combination corresponding to the character combination having no tag of the current node, and update and save a weight.

The upper level match sub-unit may be configured to match characters of sub-nodes of the current node with the characters in the N-th level of the key code string weight list; if a successful match occurs, combine the character of the current node with the character combination having no tag of the parent node into a character combination corresponding to a character combination of the current node which has a key-missing process tag, and update and save a weight; and if no successful match occurs, not save a weight.

The lower level match sub-unit may be configured to match the character of the current node with characters in a (N+1)-th level of the key code string weight list; if a successful match occurs, combine the character of the current node with the character combination having no tag of the parent node into a character combination corresponding to a character combination of the current node which has an extra-input process tag, and update and save a weight; if no successful match occurs, not save a weight.

The tagged character combination process sub-unit may be configured to, for a character combination having a tag, match the characters of sub-nodes of the current node with the characters in the N-th level of the key code string weight list; if a successful match occurs, combine the character of the current node and a character combination having a tag of the parent node into a character combination having a tag corresponding to the current node, and update and save a weight; if no successful match occurs, not save a weight.

Optionally, the candidate ranking determination sub-module may include: a weight adjustment sub-module, an extra-input-tagged character combination weight adjustment sub-module, and a character combination ranking sub-module.

The weight adjustment sub-module may be configured to, if there is a character combination having a key-missing process tag among the character combinations, adjust a weight of the character combination having the key-missing process tag according to a first preset rule.

The extra-input-tagged character combination weight adjustment sub-module may be configured to, if there is a character combination having an extra-input process tag among the character combinations, adjust a weight of the character combination having the extra-input process tag according to a second first preset rule; and The character combination ranking sub-module may be configured to, based on weights of character combinations having no tag and/or adjusted weights of character combinations having the key-missing process tag and/or adjusted weights of character combinations having the extra-input tag, determine the ranking of the candidates corresponding to the character combinations.

Optionally, the character combination ranking sub-module may include a comprehensive weight calculation unit, and a candidate ranking unit.

The comprehensive weight calculation unit may be configured to, according to the weights of the character combinations having no tag, and/or the adjusted weights of the character combinations having the key-missing process tag, and/or the adjusted weights of the character combinations having the extra-input process tag, frequency of the character combinations, usage frequency of the character combinations, time periods from the time when the character combinations are last used to the current time point, and multiple relationships between character combinations and previously entered words, calculate a comprehensive weight for each of the character combinations.

The candidate ranking unit may be configured to, based on the comprehensive weights of the character combinations, rank the candidates corresponding to the character combinations.

Optionally, the recommended input character determination sub-module may include: a reference candidate selection sub-module and a recommended input character determination sub-module.

More specifically, the reference candidate selection sub-module may be configured to, according to the ranking of candidates corresponding to the character combinations, select top M candidates as reference candidates, where M is an integer greater than 1. The recommended input character determination sub-module may be configured to, if there are n characters in the initial key code string, determine an (n+1)-th character in the M reference candidates as the recommended input character, where n is an integer greater than 1.

The weight increasing module 303 is configured to increase the weight of the recommended input character. Optionally, the weight increasing module 303 may include: a weight increasing sub-module 3031, and/or a recommended display animation addition sub-module 3032. The weight increasing sub-module 3031 may be configured to increase a weight of a key corresponding to the recommended input character.

Further, the recommended display animation addition sub-module 3032 may be configured to add recommended display animation for the key corresponding to the recommended input character to increase a tap range for the key. Optionally, the recommended display animation comprises at least one of enlargement of the key, color changing of the key, and distinguishing display of the key.

Optionally, according to another embodiment of the present disclosure, the weight increasing module 303 may further comprise: a second distance calculation sub-module 3033, a third distance calculation sub-module 3034, and a preset threshold adjustment sub-module 3035.

The second distance calculation sub-module 3033 may be configured to calculate a second distance between the touch point coordinate and a key associated with the touch point coordinate. The third distance calculation sub-module 3034 may be configured to calculate a third distance between a key corresponding to the recommended input character and the touch point coordinate. The preset threshold adjustment sub-module 3035 may be configured to, if the third distance is greater than the second distance, decrease the third distance by a preset threshold to increase the weight of the recommended input character.

Optionally, the weight increasing module 303 may further include a function key recommending sub-module 3036 configured to, if the initial key code string corresponds to one of the candidates, determine that the user has finished entering, and perform the step of determining the recommended input character, wherein the recommended input character is a function character.

In the embodiment of the present disclosure, an initial key code and/or an initial key code string inputted by a user using an input method is received; for each character in the initial key code string, a weight of the character and weights of characters surrounding the character are obtained; when character combinations are obtained from a dictionary, according to a correspondence relationship between a hierarchy in the dictionary of the input method and the hierarchy in the key code string weight list, based on the weights of the character combinations, ranking of candidates corresponding to the character combinations is determined; and then the recommended input character is determined according to the ranking and the characters in the initial key code string inputted by the user.

In this way, embodiments of the present disclosure can solve the problem that erroneous candidate input may occur because a user's finger often touches keys surrounding the target key when the user inputs literal information using a virtual keyboard displayed on a mobile terminal. Thus, the error correction capability during input of key codes by the user may be improved, and convenience for selecting the candidates of the input method may be increased.

The details about the embodiments of the system are basically similar with the embodiments of the methods and the descriptions regarding the embodiments of the system are relatively simple, and more specific details can be found in the descriptions about the methods.

The embodiments of the present disclosure are described in a progressive manner, i.e., the differences between one embodiment and another one are mainly described, and descriptions regarding similar portions between embodiments can be found in previous descriptions.

It should be understood by those skilled in the art that embodiments of the present application may be provided as a method, a device, or a computer program product. Thus, embodiments of the present application may be implemented in the form of a hardware embodiment, a software implementation, or a combination of software and hardware. Moreover, embodiments of the present application may be implemented in the form of a computer program product implemented on one or more computer readable storage medium (including but not limited to disk storage, CD-ROM, optical memory, etc.) containing computer readable program codes.

In a typical configuration, the computer device includes one or more processors (CPUs), input/output interfaces, network interfaces, and a memory. The memory may include a computer readable medium, for example, a non-permanent memory, a random access memory (RAM), and/or a non-volatile memory, such as read-only memory (ROM) or flash memory. Memory is an example of a computer readable medium. The computer readable medium includes both permanent and non-permanent media, and removable and non-removable media which can be implemented by any method or technology to realize information storage. The information may be computer readable instructions, data structures, program modules or other data. Examples of computer storage media include but are not limited to, a phase change memory (PRAM), a static random access memory (SRAM), a dynamic random access memory (DRAM), other types of random access memory (RAM), a read only memory (ROM), an electrically erasable programmable read-only memory (EEPROM), a flash memory or other memory technology, a read-only optical disk read-only memory (CD-ROM), a digital versatile disc (DVD) or other optical storage devices, a cassette magnetic tape, a magnetic tape storage device or other magnetic storage devices or any other non-transmission medium that can be used to store information that can be accessed by a computing device. As defined herein, the computer readable medium does not include non-persistent computer-readable media (i.e., transitory media), such as modulated data signals and carriers.

The embodiments of the present disclosure are described with reference to a flowchart and/or a block diagram of a method, a terminal device (system), and a computer program product according to an embodiment of the present application. It will be appreciated that each process and/or block in the flowchart and/or the block diagram as well as combinations of processes and/or blocks in flowcharts and/or block diagrams may be implemented by computer program instructions. These computer program instructions may be provided to a processor of a general purpose computer, a dedicated computer, an embedded processor, or other programmable data processing terminal device to generate a machine such that instructions executed by a processor of a computer or other programmable data processing terminal device generating means for implementing the functions specified in a process or a plurality of processes in a flowchart and/or one or more blocks in a block diagram.

The computer program instructions may also be stored in a computer readable memory capable of operating a computer or other programmable data processing terminal device in a particular manner such that instructions stored in the computer readable memory produce a comprising an instruction device, the instruction device implements the functions specified in a process or a plurality of processes in a flowchart and/or one or more blocks in a block diagram.

These computer program instructions may also be stored in a computer readable storage medium that can direct a computer or other programmable data processing apparatus to function in a particular manner, such that the computer readable storage medium having instructions stored therein comprises an article of manufacture including an instruction device which implement functions specified in one or more blocks of a flowchart or flowchart and/or block diagram.

The computer program instructions may also be loaded onto a computer or other programmable data processing apparatus to cause a series of operational steps to be performed on the computer or other programmable apparatus or other device to produce a computer implemented process, such that the instructions which execute on the compute or other programmable apparatus provide steps for implementing functions specified in a process or a plurality of processes in a flowchart and/or one or more blocks in a block diagram.

While the preferred embodiments of the present disclosure have been described, those skilled in the art will be able to make further changes and modifications to these embodiments upon the knowledge of the basic inventive concepts. Accordingly, the appended claims are intended to be construed as including the preferred embodiments and all changes and modifications that fall within the scope of the embodiments of the present disclosure.

Finally, it is to be noted that, relational terms such as first and second terms are used herein only to distinguish an entity or an operation from another entity or another operation without necessarily requiring or implying that there are actual relations or order between these entities or operations. Moreover, the term "include" "comprise" or any other variant thereof is intended to encompass non-exclusive inclusion such that a process, method, article of manufacture, or terminal device that includes not only those elements but also other elements which are not listed explicitly can be included, or the process, method, article of manufacture, or terminal device may further include the elements that are inherent to this process, method, article of manufacture, or terminal device. In the absence of more restrictions, the elements defined by the statement "including a . . . " do not preclude the presence of additional elements in the process, method, article of manufacture, or terminal device that includes the elements.

The method for ranking candidates in an input method and a system for ranking candidates in an input method provide by the present disclosure are described in detail. The details of the present disclosure and the embodiment thereof are described in the specific examples. The above descriptions of embodiments are intended to facilitate understanding of the method and the core idea of the present disclosure. Meanwhile, it will be apparent to those skilled in the art that various changes can be made to the embodiments and the scope of application in accordance with the teachings of the present disclosure. The contents of this specification should not be construed as limiting the present disclosure.

What is claimed is:

1. A method for recommending candidates in an input method, comprising steps of:
   receiving, by a terminal device, a touch operation from a user on a virtual keyboard displayed on a touch screen of the terminal device;
   determining, by the terminal device, an initial key code and/or an initial key code string corresponding to the touch operation on the virtual keyboard;
   according to the initial key code, determining, by the terminal device, a recommended input character of the virtual keyboard, including:
      for each character in the initial key code string, obtaining a weight of the character and weights of characters surrounding the character, and establishing a key code string weight list having a corresponding hierarchy according to a character input order;
      when obtaining character combinations from a dictionary, according to a correspondence relationship between a hierarchy in the dictionary of the input method and the hierarchy in the key code string weight list, determining weights of the character combinations using the key code string weight list;
      for each obtained character combination, determining whether the character combination has a missing key;

in response to the character combination having a missing key, assigning a key-missing process tag to the character combination, and adjusting a weight of the character combination by multiplying the weight of the character combination with a weight factor of 0.9;

increasing, by the terminal device, a weight of a key corresponding to the recommended input character; and displaying, by the terminal device, a recommended animation on the virtual keyboard for the key corresponding to the recommended input character to increase a tap range for the key, wherein the tap range is determined according to a coefficient and a probability of the key being the recommended input character, the coefficient being selected according to the user's input efficiency.

2. The method according to claim 1, wherein the step of determining the recommended input character according to the initial key code, further comprises:

based on the weights of the character combinations, determining ranking of candidates corresponding to the character combinations; and according to the ranking of candidates corresponding to the character combinations, determining the recommended input character.

3. The method according to claim 2, wherein the step of, for each character in the initial key code string, obtaining a weight of the character and weights of characters surrounding the character, and establishing a key code string weight list having a corresponding hierarchy according to a character input order, comprises:

recording touch point coordinates of touch points on an input keyboard interface when the user inputs the initial key code string;

for each of the touch point coordinates, determining a key associated with the touch point coordinate and keys surrounding the key;

calculating first distances between the touch point coordinate and the keys surrounding the touch point coordinate; and according to the first distances of the keys, determining a weight of a key value of the key associated with the touch point coordinate and weights of key values of the keys surrounding the key, and establishing the key code string weight list having the corresponding hierarchy according to the character input order of characters in the initial key code string.

4. The method according to claim 2, wherein the step of, when obtaining character combinations from a dictionary, according to a correspondence relationship between a hierarchy in the dictionary of the input method and the hierarchy in the key code string weight list, determining weights of the character combinations using the key code string weight list, comprises:

saving characters in a first level of character nodes of the dictionary which match a first character in the initial key code string and characters surrounding the first character as root nodes;

for characters of nodes based on root nodes, determining the weights of the character combinations according to the following procedure until traversal of characters of all nodes is finished:

for character nodes in an N-th level, N being an integer greater than 1, reading various types of character combinations corresponding to a parent node of a current node and weights corresponding to the character combinations, wherein the various types of character combinations corresponding to the parent node comprise a character combination having no tag, and/or a character combination having a key-missing process tag, and/or a character combination having an extra-input process tag;

matching a character of the current node in the dictionary with characters in an N-th level of the key code string weight list;

if the character of the current node in the dictionary matches a character in the N-th level of the key code string weight list, combining the character of the current node with the various types of character combinations corresponding to the parent node into various types of character combinations corresponding to the current node and updating weights, and saving the various types of character combinations corresponding to the current node and the weights corresponding to the various types of character combinations; and if the character of the current node does not match the characters in the N-th level of the key code string weight list, processing different types of character combinations according to corresponding types of character matching rules.

5. The method according to claim 4, wherein the step of processing different types of character combinations according to corresponding types of character matching rules, comprises:

for a character combination having no tag, combining the character of the current node with a character combination having no tag of the parent node into a character combination corresponding to the character combination having no tag of the current node, and updating and saving a weight;

matching characters of sub-nodes of the current node with the characters in the N-th level of the key code string weight list; if a successful match occurs, combining the character of the current node with the character combination having no tag of the parent node into a character combination corresponding to a character combination of the current node which has a key-missing process tag, and updating and saving a weight; and if no successful match occurs, not saving a weight;

matching the character of the current node with characters in a (N+1)-th level of the key code string weight list; if a successful match occurs, combining the character of the current node with the character combination having no tag of the parent node into a character combination corresponding to a character combination of the current node which has an extra-input process tag, and updating and saving a weight; if no successful match occurs, not saving a weight; and for a character combination having a tag, matching the characters of sub-nodes of the current node with the characters in the N-th level of the key code string weight list; if a successful match occurs, combining the character of the current node and a character combination having a tag of the parent node into a character combination having a tag corresponding to the current node, and updating and saving a weight; if no successful match occurs, not saving a weight.

6. The method according to claim 2, wherein the step of, based on the weights of the character combinations, determining ranking of candidates corresponding to the character combinations, comprises:

in response to a character combination having an extra-input process tag among the character combinations, adjusting a weight of the character combination having the extra-input process tag according to a second first preset rule; and based on weights of character combinations having no tag and/or adjusted weights of character combinations having the key-missing process tag and/or adjusted weights of character combinations having the extra-input tag, determining the ranking of the candidates corresponding to the character combinations.

7. The method according to claim 6, wherein the step of, based on weights of character combinations having no tag and/or adjusted weights of character combinations having the key-missing process tag and/or adjusted weights of character combinations having the extra-input tag, determining the ranking of the candidates corresponding to the character combinations, comprises:

according to the weights of the character combinations having no tag, and/or the adjusted weights of the character combinations having the key-missing process tag, and/or the adjusted weights of the character combinations having the extra-input process tag, frequency of the character combinations, usage frequency of the character combinations, time periods from the time when the character combinations are last used to a current time point, and multiple relationships between character combinations and previously entered words, calculating a comprehensive weight for each of the character combinations; and based on the comprehensive weights of the character combinations, ranking the candidates corresponding to the character combinations.

8. The method according to claim 2, wherein the step of according to the ranking of candidates corresponding to the character combinations, determining the recommended input character, comprises:

according to the ranking of candidates corresponding to the character combinations, selecting top M candidates as reference candidates, wherein M is an integer greater than 1; and if there are n characters in the initial key code string, determining an (n+1)-th character in the M reference candidates as the recommended input character, wherein n is an integer greater than 1.

9. The method according to claim 2, further comprising:
in response to the initial key code string corresponding to one of the candidates, determining that the user has finished inputting, and performing the step of determining the recommended input character.

10. The method according to claim 1, wherein the recommended display animation comprises at least one of enlargement of the key, color changing of the key, and distinguishing display of the key.

11. A system for recommending candidates in an input application on a terminal device, comprising:
one or more processors; and
a memory for storing programs to be executed by the one or more processors,
wherein the one or more processors execute instructions from the programs stored in the memory, the instructions causing the one or more processors to:
receive a touch operation from a user on a virtual keyboard displayed on a touch screen of the terminal device;

determine an initial key code and/or an initial key code string according to the touch operation on the virtual keyboard;

according to the initial key code, determine a recommended input character, including:
for each character in the initial key code string, obtaining a weight of the character and weights of characters surrounding the character, and establishing a key code string weight list having a corresponding hierarchy according to a character input order;

when obtaining character combinations from a dictionary, according to a correspondence relationship between a hierarchy in the dictionary of the input method and the hierarchy in the key code string weight list, determining weights of the character combinations using the key code string weight list;

for each obtained character combination, determining whether the character combination has a missing key;

in response to the character combination having a missing key, assigning a key-missing process tag to the character combination, and adjusting a weight of the character combination by multiplying the weight of the character combination with a weight factor of 0.9;

increase a weight of a key corresponding to the recommended input character; and control the touch screen to display a recommended animation on the virtual keyboard for the key corresponding to the recommended input character to increase a tap range for the key, wherein the tap range is determined according to a coefficient and a probability of the key being the recommended input character, the coefficient being selected according to the user's input efficiency.

12. The system according to claim 11, wherein the one or more processors execute instructions from the programs stored in the memory, the instructions further causing the one or more processors to:

based on the weights of the character combinations, determine ranking of candidates corresponding to the character combinations; and according to the ranking of candidates corresponding to the character combinations, determine the recommended input character.

13. The system according to claim 12, wherein the one or more processors execute instructions from the programs stored in the memory, the instructions further causing the one or more processors to:

record touch point coordinates of touch points on an input keyboard interface when the user inputs the initial key code string;

for each of the touch point coordinates, determine a key associated with the touch point coordinate and keys surrounding the key;

calculate first distances between the touch point coordinate and the keys surrounding the key; and according to the first distances of the keys, determine a weight of a key value of the key associated with the touch point coordinate and weights of key values of the keys surrounding the key, and establish the key code string weight list having the corresponding hierarchy according to the character input order of characters in the initial key code string.

14. The system according to claim 12, wherein the one or more processors execute instructions from the programs stored in the memory, the instructions further causing the one or more processors to:
- save characters in a first level of character nodes of the dictionary which match a first character in the initial key code string and characters surrounding the first character as root nodes;
- for characters of nodes based on root nodes, determine the weights of the character combinations according to the following procedure until traversal of characters of all nodes is finished:
  - for character nodes in an N-th level, N being an integer greater than 1, read various types of character combinations corresponding to a parent node of a current node and weights corresponding to the character combinations, wherein the various types of character combinations corresponding to the parent node comprise a character combination having no tag, and/or a character combination having a key-missing process tag, and/or a character combination having an extra-input process tag;
  - match a character of the current node in the dictionary with characters in an N-th level of the key code string weight list;
  - if the character of the current node in the dictionary matches a character in the N-th level of the key code string weight list, combine the character of the current node with the various types of character combinations corresponding to the parent node into various types of character combinations corresponding to the current node and update weights, and save the various types of character combinations corresponding to the current node and the weights corresponding to the various types of character combinations; and
  - if the character of the current node does not match the characters in the N-th level of the key code string weight list, process different types of character combinations according to corresponding types of character matching rules.

15. The system according to claim 14, wherein the one or more processors execute instructions from the programs stored in the memory, the instructions further causing the one or more processors to:
- for a character combination having no tag, combine the character of the current node with a character combination having no tag of the parent node into a character combination corresponding to the character combination having no tag of the current node, and update and save a weight;
- match characters of sub-nodes of the current node with the characters in the N-th level of the key code string weight list; if a successful match occurs, combine the character of the current node with the character combination having no tag of the parent node into a character combination corresponding to a character combination of the current node which has a key-missing process tag, and update and save a weight; and if no successful match occurs, not save a weight;
- match the character of the current node with characters in a (N+1)-th level of the key code string weight list; if a successful match occurs, combine the character of the current node with the character combination having no tag of the parent node into a character combination corresponding to a character combination of the current node which has an extra-input process tag, and update and save a weight; if no successful match occurs, not save a weight; and
- for a character combination having a tag, match the characters of sub-nodes of the current node with the characters in the N-th level of the key code string weight list; if a successful match occurs, combine the character of the current node and a character combination having a tag of the parent node into a character combination having a tag corresponding to the current node, and update and save a weight; if no successful match occurs, not save a weight.

16. The system according to claim 12, wherein the one or more processors execute instructions from the programs stored in the memory, the instructions further causing the one or more processors to:
- in response to a character combination having an extra-input process tag among the character combinations, adjust a weight of the character combination having the extra-input process tag according to a second first preset rule; and
- based on weights of character combinations having no tag and/or adjusted weights of character combinations having the key-missing process tag and/or adjusted weights of character combinations having the extra-input tag, determine the ranking of the candidates corresponding to the character combinations.

17. The system according to claim 16, wherein the one or more processors execute instructions from the programs stored in the memory, the instructions further causing the one or more processors to:
- according to the weights of the character combinations having no tag, and/or the adjusted weights of the character combinations having the key-missing process tag, and/or the adjusted weights of the character combinations having the extra-input process tag, frequency of the character combinations, usage frequency of the character combinations, time periods from the time when the character combinations are last used to the current time point, and multiple relationships between character combinations and previously entered words, calculate a comprehensive weight for each of the character combinations; and
- based on the comprehensive weights of the character combinations, rank the candidates corresponding to the character combinations.

18. The system according to claim 12, wherein the one or more processors execute instructions from the programs stored in the memory, the instructions further causing the one or more processors to:
- according to the ranking of candidates corresponding to the character combinations, select top M candidates as reference candidates, wherein M is an integer greater than 1; and
- if there are n characters in the initial key code string, determine an (n+1)-th character in the M reference candidates as the recommended input character, wherein n is an integer greater than 1.

19. The system according to claim 12, wherein the one or more processors execute instructions from the programs stored in the memory, the instructions further causing the one or more processors to:
- in response to the initial key code string corresponding to one of the candidates, determine that the user has finished entering, and perform the step of determining the recommended input character, wherein the recommended input character is a function character.

20. The system according to claim 11, wherein the recommended display animation comprises at least one of enlarging of the key, color changing of the key, and distinguishing display of the key.

\* \* \* \* \*